United States Patent
Whitehouse

(10) Patent No.: US 11,078,328 B1
(45) Date of Patent: Aug. 3, 2021

(54) SEQUESTERED AMORPHOUS POLYHYDROXYALKANOATE POLYMER (SAPP) MATERIAL DERIVED FROM CELLULAR BIOMASS AND PRODUCTION THEREOF

(71) Applicant: Robert Whitehouse, Lexington, MA (US)

(72) Inventor: Robert Whitehouse, Lexington, MA (US)

(*) Notice: Subject to any disclaimer, the term of this patent is extended or adjusted under 35 U.S.C. 154(b) by 0 days.

(21) Appl. No.: 17/085,762

(22) Filed: Oct. 30, 2020

(51) Int. Cl.
*C08G 63/81* (2006.01)

(52) U.S. Cl.
CPC ......... *C08G 63/81* (2013.01); *C08G 2250/00* (2013.01)

(58) Field of Classification Search
CPC ...... C08G 63/78; C08G 63/785; C08G 63/79; C08G 63/80; C08G 63/81; C08G 63/82; C08G 63/823; C08G 63/826; C08G 2250/00
See application file for complete search history.

(56) References Cited

U.S. PATENT DOCUMENTS

| | | |
|---|---|---|
| 3,044,942 A | 7/1962 | Baptist |
| 4,310,684 A | 1/1982 | Vanlautem et al. |
| 4,391,766 A | 7/1983 | Barham et al. |
| 5,821,299 A | 10/1998 | Noda |
| 5,894,062 A | 4/1999 | Liddell |
| 6,087,471 A | 7/2000 | Kurdikar et al. |
| 6,228,934 B1 * | 5/2001 | Horowitz ............... C08G 63/88 524/800 |
| 7,252,980 B2 * | 8/2007 | Walsem ............... C08G 63/89 435/134 |
| 7,713,720 B2 | 5/2010 | Walsem et al. |
| 7,981,642 B2 | 7/2011 | van Walsem et al. |
| 8,003,355 B2 | 8/2011 | van Walsem et al. |
| 8,357,508 B2 | 1/2013 | Mantelatto et al. |
| 9,045,595 B2 | 6/2015 | Mantelatto et al. |

\* cited by examiner

*Primary Examiner* — Christopher M Rodd
(74) *Attorney, Agent, or Firm* — JWIP & Patent Services, LLC; Jacob G. Weintraub, Esq.

(57) ABSTRACT

The present invention provides an efficient and cost-effective process to recover highly purified PHA homopolymers and copolymers, producing novel sequestered amorphous polyhydroxyalkanoate polymer (SAPP) materials derived from cellular biomass that are crystal competent. Such resulting materials (e.g., melt-derived solids and crystalline agglomerates), as well as methods of production of the sequestered amorphous polyhydroxyalkanoate polymer (SAPP) materials and subsequent processing, demonstrate cost-effective production of PHA polymer at commercial scale, which is heretofore not been achievable. Moreover, the methods and materials produced make feasible the long-awaited achievement in the industry for competitive commercialization of PHA homopolymers and copolymers from cellular biomass.

20 Claims, No Drawings

US 11,078,328 B1

SEQUESTERED AMORPHOUS POLYHYDROXYALKANOATE POLYMER (SAPP) MATERIAL DERIVED FROM CELLULAR BIOMASS AND PRODUCTION THEREOF

BACKGROUND OF THE INVENTION

The production of polyhydroxyalkanoate (PHA) polymers through cellular biomass microbial fermentation has been well known for many years. In fact, fermentation processes can generate a PHA polymer that may be present in an amount of about 10% to about 85% of the dry cellular biomass component; where the wide variation is a result of strain selection, feedstock composition and fermentation conditions. Moreover, the subsequent recovery of purified PHA polymers separated from the cellular biomass has also been well studied. However, even given this significant history, all known approaches to this production and recovery still suffer from significant challenges in cost effective implementation.

Historically, a variety of approaches using chlorinated solvents have been utilized due to their solvency power to dissolve crystalline PHA polymers/copolymers produced in current production methods derived from cellular biomass. Commonly, the dilute polymer solution in a chlorinated solvent is treated with large volumes of a non-solvent to precipitate the polymer, and this is repeated several times in order to eventually separate the cellular biomass from the polymer. That stated, although the use of chlorinated solvents for recovery and purification of PHAs has found success under laboratory conditions, these are not commercially viable processes that could be performed at commercial scale, especially given the environmentally unfriendly solvents consumed and requiring disposal.

Alternatively, certain non-halogenated solvent approaches have also been developed using more environmentally acceptable platforms. Such platforms use a variety of polar organic solvents under high temperature conditions to dissolve or swell the polymer and then a hydrocarbon non-solvent for precipitation separation. In this way, the cellular debris which is not soluble in the polar solvent may be removed by filtration.

Certain newer methods have found that co-feeds introduced during the PHA fermentation process result in the production of polyhydroxybutyrate (PHB) copolymers: the most common being propionic acid to introduce a 3-hydroxy valerate molecule, butane diol to introduce a 4-hydroxybutyrate molecule, and longer side chain fatty acids and triglycerides to introduce a mixture of 3-hydroxy hexanoate, 3-hydroxy octanoate, and 3-hydroxy decanoate mixed side chains. The glass transition and the crystallinity of the PHB copolymers is generally reduced given that these microbial fermentation processes using wild strain organisms produce random copolymers. In this respect, whereas PHB has a crystallinity of about 65%, the crystallinity of the PHB copolymers can easily be reduced to about 40%, which lowers their melting point and also their mechanical properties. Although the introduction of the co-monomer (through co-feeds) and corresponding reduction in crystallinity can potentially improve the hot solvent recovery processes known to all current methodology, there is always a compromise which limits the potential applications for these copolymers.

Notably, all of these current approaches to recover high purity PHA polymers/copolymers require a significant heating step that involves operating the recovery at a temperature range that promotes agglomeration of the released amorphous PHA particles, and rapid crystallization of the polymer. Unfortunately, as an artifact of the high heat of this recovery, any amorphous PHA polymer/copolymer recovered is permanently amorphous, which may not later be converted and used in its crystal form. Moreover, this crystallization often occurs at a faster rate than polymer dissolution in these solvent approaches, which encapsulates some of the residual biomass. In this way, once the PHA has crystallized encapsulating the residual biomass, removing the residual biomass is not only very challenging, but greatly increases the recovery cost.

As such, there remains a need for efficient processes to recover highly purified PHA homopolymers and copolymers from cellular biomass in order to achieve cost-effective PHA polymer commercialization. Further, there remains a need for such processes to recover this material in the nascent amorphous form that may be stored and used for later crystallization.

SUMMARY OF THE INVENTION

The present invention provides an efficient and cost-effective process to recover highly purified PHA homopolymers and copolymers, producing novel sequestered amorphous polyhydroxyalkanoate polymer (SAPP) materials derived from cellular biomass that are crystal competent. Such resulting materials (e.g., melt-derived solids and crystalline agglomerates), as well as methods of production of the sequestered amorphous polyhydroxyalkanoate polymer (SAPP) materials and subsequent processing, demonstrate cost-effective production of PHA polymer at commercial scale, which is heretofore not been achievable. Moreover, the methods and materials produced make feasible the long-awaited achievement in the industry for competitive commercialization of PHA homopolymers and copolymers from cellular biomass.

Accordingly, one aspect of the present invention provides a sequestered amorphous polyhydroxyalkanoate polymer (SAPP) material derived from cellular biomass that is crystal competent.

Another aspect of the present invention provides a crystalline agglomerate conversion of a sequestered amorphous polyhydroxyalkanoate polymer (SAPP) material derived from cellular biomass that is crystal competent, e.g., wherein the crystallinity ranges from about 10% to about 65%.

Another aspect of the present invention provides a method of production of a crystalline agglomerate conversion of a sequestered amorphous polyhydroxyalkanoate polymer (SAPP) material derived from cellular biomass that is crystal competent comprising the steps of: suspending particles of sequestered amorphous polyhydroxyalkanoate polymer (SAPP) material in a non-reactive liquid medium; increasing the temperature slowly to the optimum crystallization temperature for SAPP material with slight agitation sufficient to cause conversion of the suspended SAPP material by particle agglomeration to a dispersion of crystalline agglomerates; and maintaining the temperature of the dispersion until complete crystallization is achieved, such that crystalline agglomerate conversion of the sequestered amorphous polyhydroxyalkanoate polymer (SAPP) material is produced.

Yet another aspect of the present invention provides a melt-derived solid of a sequestered amorphous polyhydroxyalkanoate polymer (SAPP) material derived from cellular biomass that is crystal competent.

Another aspect of the present invention provides a method of production of a melt-derived solid of a sequestered amorphous polyhydroxyalkanoate polymer (SAPP) material derived from cellular biomass that is crystal competent comprising the steps of: rapidly heating particles of sequestered amorphous polyhydroxyalkanoate polymer (SAPP) material particles to a temperature beyond the optimum crystallization temperature window to create a molten SAPP material; and converting the molten SAPP material into a solid form by cooling, such that a melt-derived solid of a sequestered amorphous polyhydroxyalkanoate polymer (SAPP) material is produced.

Another aspect of the present invention provides a method of production of a sequestered amorphous polyhydroxyalkanoate polymer (SAPP) material from cellular biomass that is crystal competent comprising the steps of: disruption of cellular biomass using mechanical energy to release a mixture of amorphous polyhydroxyalkanoate polymer particles and cellular biomass suspended in an aqueous medium; centrifugation at a constrained temperature subjacent to the crystallization window and superjacent to the glass transition temperature to separate the amorphous polyhydroxyalkanoate polymer particles and the cellular biomass based on density differences; and recovery of the amorphous polyhydroxyalkanoate polymer particles separated from the cellular biomass as a dispersion of sequestered amorphous polyhydroxyalkanoate polymer (SAPP) material, such that a sequestered amorphous polyhydroxyalkanoate polymer material is produced.

Another aspect of the present invention provides a production unit suitable to produce a sequestered amorphous polyhydroxyalkanoate polymer material derived from cellular biomass that is crystal competent comprising a microbial fermentation component to produce the cellular biomass; a cellular biomass disruption component using mechanical energy to release a mixture of amorphous polyhydroxyalkanoate polymer particles and cellular biomass suspended in an aqueous medium; a centrifugation component operating at controlled temperature subjacent to the crystallization window and superjacent to the glass transition temperature to separate the amorphous polyhydroxyalkanoate polymer particles and the cellular biomass based on density differences; and a recovery component for the amorphous polyhydroxyalkanoate polymer particles separated from the cellular biomass as a dispersion of sequestered amorphous polyhydroxyalkanoate polymer (SAPP) material.

DETAILED DESCRIPTION OF THE INVENTION

Amorphous polyhydroxyalkanoate polymer produced by known methods are permanently amorphous, and therefore once purified and isolated are unable to be crystallized. The use of elevated temperatures for the production/separation of amorphous polyhydroxyalkanoate polymer results in crystallization of the PHA chains during the extraction. This crystallinity does not allow Hansen Solubility rules to apply so more aggressive solvents (chlorinated) and high temperatures (90° C.-140° C.) are needed to dissolve the semi-crystalline polymer for separation. To process a semi-crystalline PHA requires in all cases the crystalline domains to be removed by dissolution or melting, the latter requiring temperatures over 176° C. (melting point of PHB crystals) which then introduces uncontrolled degradation reactions such as crotonate end group formation and volatile crotonic acid (high generation at 185° C.-190° C.).

However, in stark contrast, the present invention provides methods and systems/units to produce novel sequestered amorphous polyhydroxyalkanoate polymer (SAPP) material derived from cellular biomass that are crystal competent. The methods of production described herein avoid the uncontrolled degradation reactions through constrained temperatures held near the glass transition temperature of the polymer material throughout the entire process of production. As such, the SAPP materials of the present invention obey the Hansen Solubility Parameter rule (and hence simple conventional solvents like ketone and ester solvents can readily dissolve the polymer); the SAPP material may be separated or sequestered by differential density differences; and may be easily chemically modified using existing ester chemistry (e.g., hydrolysis). In this way, for SAPP materials of the present invention offer many more opportunities to process the amorphous polymer.

In general, the present invention provides a process for the recovery of high purity amorphous PHA polymers from an aqueous cellular biomass dispersion using mechanical disintegration of the biomass cells and then density differentiation separation of the amorphous PHA particles from the disintegrated cell biomass while retaining the amorphous structure of the PHA cells. The temperature profile of the amorphous PHA particle recovery is such that there is no premature crystallization of the cell particles from excessive heat exposure (above 35° C.). Moreover, given that there is no requirement for a solvent recovery step in the present invention, the processes of the present invention have a clear advantage over existing recovery methods.

Accordingly, the present invention provides an efficient and cost-effective process to recover highly purified PHA homopolymers and copolymers, producing novel sequestered amorphous polyhydroxyalkanoate polymer (SAPP) materials derived from cellular biomass that are crystal competent. Such resulting materials (e.g., melt-derived solids and crystalline agglomerates), as well as methods of production of the sequestered amorphous polyhydroxyalkanoate polymer (SAPP) materials and subsequent processing, demonstrate cost-effective production of PHA polymer at commercial scale, which is heretofore not been achievable. Moreover, the methods and materials produced make feasible the long-awaited achievement in the industry for competitive commercialization of PHA homopolymers and copolymers from cellular biomass.

The present invention, including materials, methods, and production units will be described with reference to the following definitions that, for convenience, are set forth below. Unless otherwise specified, the below terms used herein are defined as follows:

I. Definitions

As used herein, the terms "a," "an," "the" and similar terms used in the context of the present invention (especially in the context of the claims) are to be construed to cover both the singular and plural unless otherwise indicated herein or clearly contradicted by the context.

The term "about" is used herein in reference to the degree or extent of the term which it modifies, and that such extent may be 100% or near to but not exactly 100% of the modified term; industry accepted standards will assist in defining the quantitative aspects of how "near" 100% is defined. In particular embodiments, the term "about" indicates ±2%, ±1% or ±0.5%. In a particular embodiment, for example, the language "about 19%" would be exactly 19%; and in an alternative particular embodiment, for example, the language "about 19%" would mean 19%±1%.

The term "agglomerate" as used, for example, in the expression "crystalline agglomerate conversion," is used herein to describe a gathered or clustered mass of crystal competent amorphous polyhydroxyalkanoate polymer that may be converted to a crystalline material, e.g., to a crystalline agglomerate conversion of the present invention.

The term "alkenyl" is art-recognized and used herein to describe an unsaturated carbon chain, from $C_1$ to $C_n$, where n varies from 2 to about 20, wherein the carbon chain may be linear, branched or cyclic and the unsaturation may be monounsaturated, i.e., with one double bond in the carbon chain; or polyunsaturated, i.e., with two or more double bonds in the carbon chain.

The term "alkyl" is art-recognized and used herein to describe a saturated carbon chain, from $C_1$ to $C_n$, where n varies from 2 to about 20, which carbon chain may be straight, branched or cyclic.

The term "automated," is used herein to describe processes or production units that do not contain steps that require a human operator to perform any of the steps. In certain embodiments, the processes or production units may be "semi-automated" containing one or more steps that require a human operator; however, differing from manual processes by containing at least one step that does not require a human operator.

The language "cellular biomass" is art-recognized, and is used herein to describe biomass originating from any microorganism or plant that is capable of producing PHA naturally or by genetic modification, in order to render it a PHA producer or make it produce more PHA. In certain embodiments, the cellar biomass comprises only PHA and cellular biomass made predominantly (but not exclusively) from phospholipids having two fatty acid chains linked through a glycerol unit to a phosphate unit and a quaternary amine moiety subsequently crystallized, e.g., by exposure to temperature between about 50° C. and about 90° C. In certain embodiments, the crystal competent sequestered amorphous polyhydroxyalkanoate polymer material may become semi-crystalline, comprising a crystallinity from about 10% to about 65% as defined by differential scanning calorimetry (DSC).

The language "melt-derived solid" is used herein to describe a solid material prepared by converting a solid amorphous phase directly to a molten amorphous phase with heat energy, but without any heating energy being required to re-melt crystalline domains (e.g., polyhydroxyalkanoate polymer crystalline domains), and therefore resulting in the increased mobility of the polymer chains without introducing crystallization in the polymer material.

The term "semi-crystalline" is art-recognized, and is used herein to describe materials having a highly ordered molecular structure with sharp melt points, which do not gradually soften with a temperature increase; but instead, semi-crystalline materials remain solid until a given quantity of heat is absorbed and then rapidly change into a low viscosity liquid.

The term "sequestered" is used herein to describe the characterization of being in an isolated form, e.g., separated from the residual cellular biomass and, for example, other impurities.

The term "subjacent" is art-recognized, and used herein to describe the characteristic of being situated below something else. For example, the language "subjacent to the crystallization window" describes a temperature being situated below the crystallization window, i.e., a temperature that may be up to (e.g., adjacent to) the crystallization window, but stays below the window.

The term "superjacent" is art-recognized, and used herein to describe the characteristic of being situated above something else. For example, the language "superjacent to the

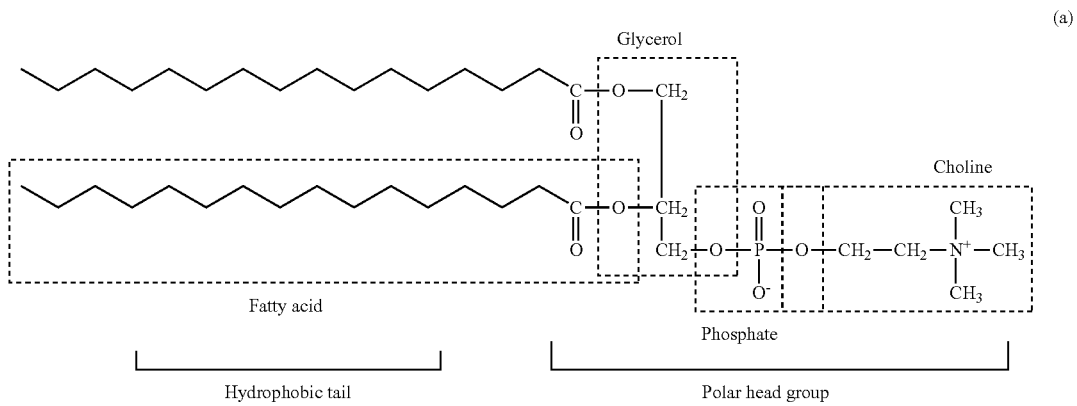 [SMILES: CCCCCCCCCCCCCCCC(=O)OCC(COP(=O)([O-])OCC[N+](C)(C)C)OC(=O)CCCCCCCCCCCCCCC]

(a)

glass transition temperature" describes a temperature being situated above the glass transition temperature, i.e., a temperature that may be down to (e.g., adjacent to) the glass transition temperature, but stays above the glass transition temperature.

II. Sequestered Amorphous Polyhydroxyalkanoate Polymer Material of the Invention One embodiment of the present invention provides a sequestered amorphous polyhydroxyalkanoate polymer (SAPP) material derived from cellular biomass that is crystal competent.

The language "constrained temperature" is used herein to describe temperatures limited to a pre-defined temperature window (i.e., comprising an upper and lower limit). In certain embodiments, the constrained temperature window is a temperature subjacent to the crystallization window and superjacent to the glass transition temperature.

The language "crystal competent" is used herein to describe sequestered amorphous polyhydroxyalkanoate polymer material that is not permanently amorphous, i.e., in stark contrast to known isolations of amorphous polyhydroxyalkanoate polymer material. In particular, the sequestered amorphous polyhydroxyalkanoate polymer material may be recovered as an amorphous polymer but may be The present invention is applicable to PHAs produced by natural or genetically modified microorganisms or plants. In certain embodiments, the polyhydroxyalkanoate, or PHA, is a polymer constituted by repetitions of the following unit:

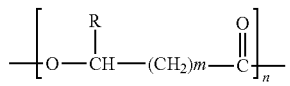

wherein R is an alkyl or alkenyl group of variable length and m and n are integers, in the polymers mentioned above R and m assuming the following values:
PHB: R=CH$_3$, m=1
PHB-V: R=CH$_3$ or CH$_3$—CH$_2$—, m=1
P4HB: R=H, m=2
P3HB-4HB: R=H or CH$_3$, m=1 or 2
PHHX: R=CH$_3$—CH$_2$—CH$_2$—, m=1.

In certain embodiments of the present invention, the sequestered amorphous polyhydroxyalkanoate polymer material is a homopolymer. In certain embodiments, the sequestered amorphous polyhydroxyalkanoate polymer material is a polyhydroxybutyrate homopolymer. In particular embodiments, the polyhydroxyalkanoate polymer comprises a poly 3-hydroxybutyrate homopolymer (PHB), e.g., which has a crystallinity of greater than 60% and a melting point around 175° C. to 177° C. but thermally degrades around 185° C. to 190° C.

In certain embodiments of the present invention, the sequestered amorphous polyhydroxyalkanoate polymer material is a copolymer. In certain embodiments, the co-monomers may be selected from one or more of 3-hydroxyvalerate, 3 hydroxyhexanoate, 3-hydroxyoctanoate and 4-hydroxybutyrate. In particular embodiments, a polyhydroxybutyrate copolymer of the present invention comprises at least 80% by weight of 3-hydroxybutyrate monomer units and from about 20% by weight of at least one hydroxyalkanoate monomer units selected from 3-hydroxyvalerate, 3-hydroxyhexanoate, 3-hydroxyoctanoate, 3-hydroxydecanoate, 3-hydroxydodecanoate and 4-hydroxybutyrate. Notably, PHB has a recorded glass transition temperature between 0° C. and +7° C.; however, introducing other co-monomer units reduces the glass transition temperature and also crystallinity of the copolymer.

In certain embodiments of the present invention, the sequestered amorphous polyhydroxyalkanoate polymer material is polyhydroxybutyrate copolymer comprising at least 80% by weight of 3-hydroxybutyrate monomer units and about 20% by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate.

In certain embodiments of the present invention, the sequestered amorphous polyhydroxyalkanoate polymer material is greater than 99% pure.

In certain embodiments of the present invention, the sequestered amorphous polyhydroxyalkanoate polymer material comprises less than 1% degradative products selected from the group consisting of cellular biomass, nitrogen (e.g., residual nitrogen), phosphorous (e.g., residual phosphorous), inorganic mineral salts, and any combination thereof. In certain embodiments, the sequestered amorphous polyhydroxyalkanoate polymer material comprises less than 0.01% residual nitrogen and 0.01% phosphorous from the cellular biomass.

In certain embodiments of the present invention, the SAPP material comprises amorphous particles. In certain embodiments, the particles have a mean particle size from about 20 nm to about 0.1 microns. In particular embodiments, the particles have a mean particle size from about 20 nm to about 50 nm. In specific embodiments, the particles have a mean particle size from about 40 nm to about 50 nm.

In certain embodiments of the present invention, the sequestered amorphous polyhydroxyalkanoate polymer material production is sequestered at commercial production levels, e.g., from 10 kg/hr to over 100 kg/hr.

A. Crystalline Agglomerate Conversion

The sequestered amorphous polyhydroxyalkanoate polymer (SAPP) material of the present invention derived from cellular biomass is crystal competent. Consequently, through the innovative methodology described herein, this isolated amorphous material may be subsequently crystallized for a variety of uses. In this respect, there is often the need for crystalline PHA particles of controlled size and crystallinity for specific secondary applications, such as a microbial nutrient source in tissue culturing or denitrification in water purification operations. As such, one embodiment of the present invention provides a crystalline agglomerate conversion of a sequestered amorphous polyhydroxyalkanoate polymer (SAPP) material, e.g., particles, derived from cellular biomass that is crystal competent.

In certain embodiments of the present invention, the crystallinity ranges from about 20% to about 65%, e.g., from about 30% to about 65% (i.e., as defined by differential scanning calorimetry). In certain embodiments, the crystal agglomerate conversion occurs upon heating the sequestered amorphous polyhydroxyalkanoate polymer (SAPP) material to a temperature crystallization window, e.g., between about 50° C. and about 90° C. In particular embodiments, the nucleation window for PHA crystallization, where conversion of the amorphous polyhydroxyalkanoate polymer agglomerate to crystals occurs, is about half the distance between the Tg (glass transition) and Tm (crystal melting) transitions, e.g., from about 60° C. to about 90° C.

B. Melt-Derived Solid

Alternatively, the sequestered amorphous polyhydroxyalkanoate polymer (SAPP) material of the present invention may be used to produce melt-derived solids. As such, one embodiment of the present invention provides a melt-derived solid of a sequestered amorphous polyhydroxyalkanoate polymer (SAPP) material, e.g., particles, derived from cellular biomass that is crystal competent.

In certain applications, like thermoplastic processing, there is a need to subject the SAPP material to temperatures that increase the mobility of the polymer chains without introducing crystallization in the polymer material. In certain embodiments, the sequestered amorphous polyhydroxyalkanoate polymer (SAPP) material, e.g., particles, may be transferred to plastic processing equipment like extruders where the temperature is rapidly changed from ambient conditions to, for example, between 120° C. and 180° C. with minimal exposure in the 60° C. to 90° C. temperature window so that the SAPP material is converted from a solid amorphous phase to a molten amorphous phase without any heating energy required to re-melt polyhydroxyalkanoate polymer crystalline domains. Such mobile PHA chains can then me processed in normal plastic operations such as sheet and film extrusion, injection molding, blow molding and fiber extrusion. During these plastic conversion operations, the PHA polymer is transitioning from the high temperature (below degradation temperature) back to ambient conditions. This cooling operation may proceed by allowing the PHA polymer to reside in the optimum nucleation window for PHA crystallization to occur, or can rapidly be transitioned with no or minimal crystallization occurring and an essentially amorphous fabricated structure formed. This also allows the substantially amorphous fabricated polymer structure to subsequently undergo crystallization in a secondary operation, e.g., thermoforming or fiber annealing orientation.

In certain embodiments of the present invention, the melt-derived solid is crystallized.

In certain embodiments of the present invention, the melt-derived solid is a cast sheet.

In certain embodiments of the present invention, the melt-derived solid is in the form of a fiber.

III. Methods of Production of the Invention

The sequestered amorphous polyhydroxyalkanoate polymer (SAPP) materials of the invention, including the further processed materials (e.g., melt-derived solids and crystalline agglomerates) may be produced by the methods provided herein.

A. Method of Production of Sequestered Amorphous Polyhydroxyalkanoate Polymer (Sapp) Material Accordingly, one embodiment of the present invention provides a method of production of a sequestered amorphous polyhydroxyalkanoate polymer (SAPP) material from cellular biomass that is crystal competent comprising the steps of:

disruption of cellular biomass using mechanical energy to release a mixture of amorphous polyhydroxyalkanoate polymer particles and cellular biomass suspended in an aqueous medium;

centrifugation at a constrained temperature subjacent to the crystallization window and superjacent to the glass transition temperature to separate the amorphous polyhydroxyalkanoate polymer particles and the cellular biomass based on density differences; and recovery of the amorphous polyhydroxyalkanoate polymer particles separated from the cellular biomass as a dispersion of sequestered amorphous polyhydroxyalkanoate polymer (SAPP) material, such that a sequestered amorphous polyhydroxyalkanoate polymer material is produced. In certain embodiments of the present invention, the method further comprises the step of microbial fermentation, e.g., aqueous fermentation, to produce the cellular biomass.

The selection of the temperature is important for successfully carrying out the separation process and maintaining the PHA particles in an amorphous form. In particular, the temperature for the mechanical disintegration/disruption and subsequent separation steps is close to the glass transition temperature of the polymer and above the freezing point of the aqueous dispersion.

In certain embodiments of the present invention, the constrained temperature of the aqueous medium is a temperature window between about 3° C. and 35° C.

In certain embodiments of the present invention, the method of production is a continuous process.

In certain embodiments of the present invention, the method of production is automated, e.g., semi-automated.

In certain embodiments of the present invention, the polyhydroxyalkanoate polymer contains predominantly 3-hydroxybutyrate repeat units. In certain embodiments, the method of production further comprises hydrolysis of the amorphous poly3-hydroxy butyrate using sodium hydroxide under a temperature below the crystallization temperature window for polymer crystallization to produce sodium 3-hydroxybutyrate.

In certain embodiments of the present invention, the sequestered amorphous polyhydroxyalkanoate polymer (SAPP) material is further subjected to a temperature crystallization window between about 50° C. and about 90° C., producing a crystallinity of about 20% to about 65%.

In certain embodiments of the present invention, the quantity of production of sequestered amorphous polyhydroxyalkanoate polymer (SAPP) material from cellular biomass is sequestered at commercial production levels. In certain embodiments, the commercial production levels are measured by a production of sequestered amorphous polyhydroxyalkanoate polymer (SAPP) material from 10 kg/hr to over 100 kg/hr.

i. Disruption of Cellular Biomass

The aqueous cellular biomass dispersion produced by microbial fermentation contains PHA polymer encapsulated within the cell biomass, which is subjected to mechanical energy to break open the cells and release the amorphous PHA particles. This mechanical energy is used to disrupt the biomass cellular structure and release the amorphous PHA particles. A number of mechanical approaches for cell disruption are known, and include, for example, ultra-sonification, high pressure homogenizer/disintegrators, and static and continuous flow bead mills where high localized energy can be introduced with good low temperature control. Further, the process of cell disruption may be carried out in gram batch quantities in the laboratory or in rate of production of sequestered amorphous polyhydroxyalkanoate polymer (SAPP) material of 10 kg/hr to over 100 kg/hr. These production processes may be batch or continuous in operation.

In certain embodiments of the present invention, cell disruption may be achieved by a high-speed bead mill, consisting of a series of rotating discs and a charge of spherical grinding media, such as alumina or zirconia oxide. The rotating discs accelerate the beads in a radial direction and they form streaming layers with different velocities. In this way, shearing forces are created, leading to cell disruption. In particular embodiments, the cell suspension is agitated at a very high speed. In specific embodiments, the mill chamber may be almost full of a narrow particle size grinding beads during operation, e.g., with the concentration of grinding beads being 70-90% of the volume of the chamber. The bead size depends on the density and viscosity of the feed, and it usually is in the range 0.2-0.5 mm for bacteria and 0.4-0.7 mm for yeasts. In specific embodiments, cell disintegration depends on the bead loading, the design of the agitator, and its speed.

In certain embodiments of the present invention, cell disruption may be achieved by ultrasonic disintegration of cell structures, which is a well-known process for breaking cell structures by generating alternating high-pressure and low pressure waves the liquid medium. During the low-pressure cycle, the ultrasonic waves create small bubbles in the liquid that collapse violently during the high-pressure cycle. The phenomenon is termed cavitation. The implosion of the cavitation bubble causes strong hydrodynamic shear forces. Depending on the desired effects of treatment, a combination of different frequencies and displacement amplitude is applied. These frequencies range between about 25 and 55 kHz, with the displacement amplitude of the resonant body of between about 22 and 50 μm and flow rates ranging from about 0.005 L/minute (e.g., in research) to about 10 L/minute (e.g., in production level)

In certain embodiments of the present invention, the mechanical energy used to disrupt the cellular biomass is provided using a process selected from the group consisting of ultrasonic units, high pressure homogenizer/disintegrators, bead mills, and any combination thereof.

ii. Centrifugation at Constrained Temperature

The amorphous PHA particles may be separated from the cellular biomass using density differentiation such as centrifugation normal sedimentation, wherein the PHA particles settle and the fragmented cellular biomass floats to the surface. Given that water has a density around 1 g/cc, and wherein the density of the PHA polymer is about 1.2 to 1.25 g/cc and that of the biological cell density can be about 0.95 to 1.02 g/cc, in certain embodiments, cellular biomass may be separated from the amorphous PHA particles using density differences reflected in water, i.e., as an aqueous suspension. In certain embodiments, the PHA microbial biomass derived from the fermentation process is an aqueous suspension and therefore in an ideal form for the centrifugation recovery process of this invention.

During the centrifugation, the lower density aqueous biomass and inorganic salts (e.g., inorganic mineral salts used in the fermentation process) are separated as the low-density layer, while the higher density PHA particles agglomerate and solidify into amorphous PHA material, e.g., particles. The intensity of the densification process may be controlled by temperature, centrifugal speed and spin time. In certain embodiments, at constrained temperatures, the PHA particles are compacted but do not coalesce into a larger amorphous phase, which can then be easily re-dispersed during subsequent washing cycles, e.g., the particles that are brought together during the centrifugal spinning operation can be easily separated using sonic or mechanical mixing during the washing and dilution stages. Moreover, the size of the amorphous PHA particles can be retained in predominantly sub-micron size if kept at temperatures close to the PHA polymer Tg and away from the nuclei crystallization window for the PHA polymer.

Centrifugation may be repeated to densify the PHA particles and decant the aqueous cellular phospholipid mixture. Because the separation process is carried out at temperatures close to the polymer Tg, in certain embodiments, the released PHA amorphous particles are small having a primary particle size ranging from around 50 nm to 150 nm.

In certain embodiments of the present invention, the centrifugal separation of the polyhydroxyalkanoate polymer particles from the cellular biomass further comprises one or more washing cycles. In certain embodiments, the washing cycles contains hydrogen peroxide or ozone treatment to sterilize the dispersion of sequestered amorphous polyhydroxyalkanoate polymer (SAPP) material. In particular embodiments, if the SAPP material is being considered for medical or pharmaceutical applications it may be sterilized during the washing stages by treatment with hydrogen peroxide or ozone which will digest any residual microorganisms.

iii. Recovery of Amorphous Polyhydroxyalkanoate Polymer Particles

The amorphous polyhydroxyalkanoate polymer particles separated from the cellular biomass are recovered as a dispersion of sequestered amorphous polyhydroxyalkanoate polymer (SAPP) material, e.g., particles. In certain embodiments, the resultant product is a suspension of amorphous PHA particles in an aqueous medium. Dry amorphous PHA particles may then be obtained, e.g., by low temperature removal of the water molecules by vacuum drying at temperature below 30° C. or washing with a solvent which is miscible with water but insoluble for the amorphous PHA particles. Storage of the dried amorphous PHA particles may be carried out close to the Tg of the PHA polymer to avoid coalescence of the particles and solidification. In particular embodiments, the storage conditions for the amorphous PHA aqueous dispersion of dry solid particles may be from about 0° C. to about 35° C., e.g., a temperature window of 15° C. to 25° C.

The recovery process of this invention has minimal impact on the molecular weight of the amorphous polymer chains. If a reduction of molecular weight is required to increase chain mobility during subsequent processing operations then treatment with an alkali solution like sodium hydroxide, e.g., for a period of 10 minutes to 2 hours in the temperature processing window may be employed followed by an acid neutralizing step to remove any residual alkali and alkali salt chain end groups. Amorphous PHB particles of the present invention may be treated with sodium hydroxide for a much longer time period to convert the polymer chains to sodium 3-hydroxybutyrate, i.e., a well-known nutrient additive. This process is much easier to accomplish a high purity sodium salt product compared with high temperature sodium hydroxide hydrolysis of traditional crystalline PHB material where high levels of crotonate can be generated.

B. Method of Production of Crystalline Agglomerate Conversion

Another embodiment of the present invention provides a method of production of a crystalline agglomerate conversion of a sequestered amorphous polyhydroxyalkanoate polymer (SAPP) material derived from cellular biomass that is crystal competent comprising the steps of:

suspending particles of sequestered amorphous polyhydroxyalkanoate polymer (SAPP) material in a non-reactive liquid medium;

increasing the temperature slowly to the optimum crystallization temperature for SAPP material with slight agitation sufficient to cause conversion of the suspended SAPP material by particle agglomeration, e.g., between about 50° C. and about 90° C., to a dispersion of crystalline agglomerates; and maintaining the temperature of the dispersion until complete crystallization is achieved, such that crystalline agglomerate conversion of the sequestered amorphous polyhydroxyalkanoate polymer (SAPP) material is produced. In certain embodiments of the present invention, the method further comprises the step of cooling to ambient temperature and recovery of the crystalline agglomerate conversion material, e.g., particles, of the present invention. Crystalline agglomerate conversions of the present invention, in general, may be generated by transitioning the amorphous PHA particles into the polymer nucleation window for the desired time period, e.g., about 1 minute to about 20 minutes, and then allowing the consolidated and nucleated particles to be cooled to ambient conditions and then recovered.

In certain embodiments of the present invention, the non-reactive liquid medium may be selected from the group consisting of water, n-octane (bpt 125° C.), methyl cyclohexane (bpt 101° C.), kerosene (150-300° C.), Galden perfluoroether solvents (boiling point ranging from 110° C. to 135° C.), and any combination thereof.

i. Suspending Particles of Sequestered Amorphous Polyhydroxyalkanoate Polymer (SAPP) Material Sequestered particles of amorphous polyhydroxyalkanoate polymer (SAPP) material, e.g., previously recovered, may be suspended in a non-reactive liquid medium, i.e., which is stable in the nucleating temperature window profile. This non-reactive liquid medium may be an aqueous phase (e.g., water) or a non-aqueous liquid, such as a hydrocarbon fluid (e.g., n-octane, methyl cyclohexane, kerosene, and/or Galden perfluoroether solvents).

ii. Increasing the Temperature Slowly to the Optimum Crystallization Temperature The dispersion is continuously agitated as the temperature is slowly increased into the crystallization window. In certain embodiments, the speed of agitation is controlled to allow the amorphous PHA particles to start to coalesce and grow in size prior to crystallization. Additives such as plasticizers for the amorphous PHA polymer may be added to accelerate the coalescence of the amorphous PHA nanoparticles and growth to >mm size.

iii. Maintaining Temperature to Complete Crystallization

Conversion of the amorphous PHA particles unto crystalline agglomerate PHA particles of defined size begins by suspending the amorphous PHA particles in a non-reactive liquid medium and then submitting the agitated dispersion to a gradual temperature increase into the optimum crystallization window for the PHA polymer, e.g., which is between 60° C. and 90° C. This temperature is maintained for a defined period of time to complete the crystallization of the agglomerate to a crystalline agglomerate conversion of the present invention. The crystalline agglomerate conversion PHA particles may then be cooled to ambient conditions before being separated and washed from the liquid medium and dried.

The crystallization window has an inverted bell profile with slow crystallization rates at 50° C. and 90° C. with maximum crystallization rates 70-80° C. In certain embodiments, in order to crystallize while maintaining the smallest particle size, a crystallization temperature of 50-60° C. is used with high agitation. In certain embodiments, in order to crystallize while increasing the particle size, a crystallization temperature of 50-60° C. is used with low agitation to promote agglomeration.

In certain embodiments of the present invention, the method further comprises the step of cooling the dispersion to ambient conditions to collect the crystalline agglomerates. In certain embodiments, the collection of the crystalline agglomerates comprises drying the crystalline agglomerates.

C. Method of Production of Melt-Derived Solid

Another embodiment of the present invention provides a method of production of a melt-derived solid of a sequestered amorphous polyhydroxyalkanoate polymer (SAPP) material derived from cellular biomass that is crystal competent comprising the steps of:

rapidly heating particles of sequestered amorphous polyhydroxyalkanoate polymer (SAPP) material particles to a temperature beyond the optimum crystallization temperature window, e.g., above 130° C. and below 185° C. (e.g., in a screw extruder, e.g., twin screw extruder) to create a molten SAPP material; and converting the molten SAPP material into a solid form by cooling, such that a melt-derived solid of a sequestered amorphous polyhydroxyalkanoate polymer (SAPP) material is produced. In general, the rapid heating creates a molten polymer SAPP material containing the amorphous PHA polymer, and for example, potentially other additives, which may then be extruded under a controlled temperature reduction profile to solidify into a solid structure. This cooling profile may be stopped within the optimum crystallization window to develop full crystallization or more rapidly quenched through this crystallization window resulting in a solid amorphous form.

In certain embodiments of the present invention, the molten amorphous PHA polymer, starting at 135° C.-180° C. with no residual crystal structure, may be rapidly quenched through the fabrication step to below 50° C. and become solid, but also amorphous. In particular embodiments, this could be ideal for amorphous sheet, fiber or rod formation with high clarity (i.e., because there are no, or little, crystal domains).

In certain embodiments of the present invention, the melt-derived solid is a cast sheet. The amorphous sheet may then be recrystallized while being thermoformed, e.g., into a tray or cup form. Such products may have increased heat resistance for use in microwave and oven applications (i.e., analogous to CPET (crystalline PET) containers).

In certain embodiments of the present invention, the melt-derived solid is fully crystallized during the cooling process from the melt.

In certain embodiments of the present invention, the method further comprises the step of subjecting the melt-derived solid cast sheet to a thermoforming operation within the crystallization temperature window of the SAPP material.

In certain embodiments of the present invention, the melt-derived solid is in the form of a fiber. In certain embodiments, the fiber may be produced from an amorphous PHA dissolved in a solvent via a gel spinning or solvent evaporative spraying operation.

In certain embodiments of the present invention, the method further comprises the step of subjecting the melt-derived solid fiber to a sequence of drawing and annealing steps to produce a highly crystalline fiber. In certain embodiments, the rod or strand can then be warmed and subjected to a drawing operation including crystallization to provide a very high strength fiber (e.g., with strain induced crystallization and thermal crystallization).

IV. Production Units of the Invention

The methods of the present invention may be implemented in a variety of production units that operate as a single continuous flow process. As such, one embodiment of the present invention provides a production unit suitable to produce a sequestered amorphous polyhydroxyalkanoate polymer material derived from cellular biomass that is crystal competent comprising a microbial fermentation component to produce the cellular biomass;

cellular biomass disruption component using mechanical energy to release a mixture of amorphous polyhydroxyalkanoate polymer particles and cellular biomass suspended in an aqueous medium;

a centrifugation component operating at controlled temperature subjacent to the crystallization window and superjacent to the glass transition temperature (e.g., close to the glass transition temperature of the polymer and above the freezing point of the aqueous dispersion) to separate the amorphous polyhydroxyalkanoate polymer particles and the cellular biomass based on density differences; and a recovery component for the amorphous polyhydroxyalkanoate polymer particles separated from the cellular biomass as a dispersion of sequestered amorphous polyhydroxyalkanoate polymer (SAPP) material, e.g., capable of collecting the particles and drying the particles.

In certain embodiments, the production unit is automated.
In certain embodiments, the production unit is semi-automated.

EXEMPLIFICATION

Example 1

Production of Sequestered Amorphous Polyhydroxyalkanoate Polymer Material

Methods of production of the sequestered amorphous polyhydroxyalkanoate polymer (SAPP) material of the present invention that is crystal competent is described in this example In experimental Runs 1 through 4 disruption of cellular biomass using mechanical energy to release a mixture of amorphous polyhydroxyalkanoate polymer particles and cellular biomass suspended in an aqueous medium was achieved using a continuing wet milling process. This was coupled with centrifugation at a constrained temperature subjacent to the crystallization window and superjacent to the glass transition temperature to separate the phospholipid biomass component from the amorphous PHA particles. Recovery of the amorphous polyhydroxyalkanoate polymer particles separated from the cellular biomass as a dispersion of sequestered amorphous polyhydroxyalkanoate polymer (SAPP) material, followed by drying, showed amorphous PHA particles having a particle size from about 50 nm to less than 100 nm as measured by SEM. The SEM unit used provided elemental analysis and indicated that the level of nitrogen and phosphorous were below the detection limits of the unit.

Materials

The PHA fermentation broth utilized for each experimental run was supplied by CJ Research LLC, Woburn Mass., having the reference MF 2018-002-M2300-8598. The PHA broth was analyzed and showed PHA copolymer with Tg by DSC of $-5.4°$ C. and a crystallinity by DSC of 42.3%. The PHA broth had a total solids content of 29.1% of which 88.4% of the solid material was PHA and the remainder cell mass and dissolved solids from the fermentation process. The PHA broth was stored at $5°$ C. in a chill room at CJ Research and in an insulated freezer box with 50% of the volume packed with ice and freezer blocks conditioned at $-35°$ C.

The cell disruption trial was carried out using a Dyno Mill KDL research model with a zirconium oxide/silica ceramic grinding bead medium with a density of 3.8 g/cc, with a diameter range of 0.40-0.60 mm and chemical composition of 69% $ZrO_2$+31% $SiO_2$. The ceramic grinding medium was introduced into Dyno Mill chamber to about 85% volume capacity, e.g., providing suitable freedom for rotator agitation. Water was pumped through the Dyno Mill with the beads being rotated to ensure good bead packing and no leakages. The unit was then available for cell disruption of the PHA fermentation broth.

Methods

A. Experimental Run 1
PHA broth pumping rate 4.7 kg/hr
Dyno Mill bead rotation speed 16 rpm
PHA broth flow rate through the Dyno Mill 10 m/s
PHA broth inlet temperature 5C
PHA exit temperature 27.6C Observation of the discharged PHA dispersion indicated a slight increase in viscosity and slight brownish liquid building on the surface of the milled PHA dispersion which was easily removed as an upper surface layer using a centrifuge. The sediment was diluted with water and then passed through a centrifuge operation three separate times with no further brown liquid being apparent. The sedimented paste was diluted to about 5% solids content and then air dried under ambient conditions on a paper substrate. The dried coated paper substrate was then mount on a SEM stub coated with a silver conductive vapor layer and viewed at 10,000 magnification. PHA particles with an average diameter of 50-60 nm were observed with no apparent larger particles.

B. Experimental Run 2
PHA broth pumping rate 4.5 kg/hr
Dyno Mill bead rotation speed 20 rpm
PHA broth flow rate through the Dyno Mill 10 m/s
PHA broth inlet temperature 20C
PHA exit temperature 28.2C Observation of the discharged PHA dispersion indicated an increase in viscosity higher than run 1 and an increase in brownish liquid volume building on the surface of the milled PHA dispersion which was easily removed as an upper surface layer using a centrifuge. The sediment was diluted with water and then passed through a centrifuge operation three separate times with no further brown liquid being apparent. The sedimented paste was diluted to about 5% solids content and then air dried under ambient conditions on a paper substrate. The dried coated paper substrate was then mount on a SEM stub coated with a silver conductive vapor layer and viewed at 10,000 magnification. PHA particles with an average diameter of 55-65 nm were observed with no apparent larger particles.

C. Experimental Run 3
PHA broth pumping rate 4.7 kg/hr
Dyno Mill bead rotation speed 18 rpm
PHA broth flow rate through the Dyno Mill 20 m/s
PHA broth inlet temperature 15C
PHA exit temperature 30.0C Observation of the discharge PHA dispersion indicated an increase in viscosity similar to run 2 with a slightly higher brownish liquid building on the surface of the milled PHA dispersion which was easily removed as an upper surface layer using a centrifuge. The sediment was diluted with water and then passed through a centrifuge operation three separate times with no further brown liquid being apparent. The sedimented paste was diluted to about 5% solids content and then air dried under ambient conditions on a paper substrate. The dried coated paper substrate was then mount on a SEM stub coated with a silver conductive vapor layer and viewed at 10,000 magnification. PHA particles with an average diameter of 50-55 nm were observed with no apparent larger particles.

D. Experimental Run 4
PHA broth pumping rate 4.5 kg/hr
Dyno Mill bead rotation speed 18 rpm
PHA broth flow rate through the Dyno Mill 20 m/s
PHA broth inlet temperature 5C
PHA exit temperature 26.0C Observation of the discharge PHA dispersion indicated a significant increase in viscosity and structure compared to run 2 with a significant volume of brownish liquid building on the surface of the milled PHA dispersion which was easily removed as an upper surface layer using a centrifuge. The sediment was diluted with water and then passed through a centrifuge operation three separate times with no further brown liquid being apparent. The sediment paste was diluted to about 5% solids content and then air dried under ambient conditions on a paper substrate. The dried coated paper substrate was then mount on a SEM stub coated with a silver conductive vapor layer and viewed at ×10,000 magnification. PHA particles with an average diameter of 50-55 nm were observed with no apparent larger particles.

INCORPORATION BY REFERENCE

The entire contents of all patents, published patent applications and other references cited herein are hereby expressly incorporated herein in their entireties by reference.

EQUIVALENTS

Detailed embodiments of the present invention are disclosed here; however, it is to be understood that the disclosed embodiments are merely illustrative of the invention that may be embodied in various forms. In addition, each of the examples given in connection with the various embodiments of the invention is intended to be illustrative, and not restrictive.

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. A sequestered amorphous polyhydroxyalkanoate polymer (SAPP) material derived from cellular biomass that is crystal competent, and in the form of dry particles.

2. The SAPP material of claim 1, wherein the sequestered amorphous polyhydroxyalkanoate polymer material is a homopolymer.

3. The SAPP material of claim 1, wherein the polyhydroxyalkanoate polymer comprises a poly 3-hydroxybutyrate homopolymer.

4. The SAPP material of claim 1, wherein the sequestered amorphous polyhydroxyalkanoate polymer material is a copolymer.

5. The SAPP material of claim 1, wherein the sequestered amorphous polyhydroxyalkanoate polymer material is polyhydroxybutyrate copolymer comprising at least 80% by weight of 3-hydroxybutyrate monomer units and about 20% by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate.

6. The SAPP material of claim 1, wherein the sequestered amorphous polyhydroxyalkanoate polymer material is greater than 99% pure.

7. The SAPP material of claim 1, wherein the sequestered amorphous polyhydroxyalkanoate polymer material comprises less than 1% degradative products selected from the group consisting of cellular biomass, nitrogen, phosphorous, inorganic mineral salts, and any combination thereof.

8. The SAPP material of claim 1, wherein the sequestered amorphous polyhydroxyalkanoate polymer material production is sequestered at commercial production levels.

9. A method of production of a sequestered amorphous polyhydroxyalkanoate polymer (SAPP) material from cellular biomass that is crystal competent comprising the steps of:
  disruption of cellular biomass using mechanical energy to release a mixture of amorphous polyhydroxyalkanoate polymer particles and cellular biomass suspended in an aqueous medium;
  centrifugation at a constrained temperature subjacent to the crystallization window and superjacent to the glass transition temperature to separate the amorphous polyhydroxyalkanoate polymer particles and the cellular biomass based on density differences; and
  recovery of the amorphous polyhydroxyalkanoate polymer particles separated from the cellular biomass as a dispersion of sequestered amorphous polyhydroxyalkanoate polymer (SAPP) material,
  such that a sequestered amorphous polyhydroxyalkanoate polymer material is produced.

10. The method of production of claim 9, further comprising the step of microbial fermentation to produce the cellular biomass.

11. The method of production of claim 9, wherein the constrained temperature of the aqueous medium is a temperature window between about 3° C. and 35° C.

12. The method of production of claim 9, wherein the mechanical energy used to disrupt the cellular biomass is provided using a process selected from the group consisting of ultrasonic units, high pressure homogenizer/disintegrators, bead mills, and any combination thereof.

13. The method of production of claim 9, wherein the centrifugal separation of the polyhydroxyalkanoate polymer particles from the cellular biomass further comprises one or more washing cycles.

14. The method of production of claim 13, wherein one of the washing cycles contains hydrogen peroxide or ozone treatment to sterilize the dispersion of sequestered amorphous polyhydroxyalkanoate polymer (SAPP) material.

15. The method of production of claim 9, wherein the polyhydroxyalkanoate polymer contains predominantly 3-hydroxybutyrate repeat units.

16. The method of production of claim 15, further comprising hydrolysis of the amorphous poly3-hydroxy butyrate using sodium hydroxide under a temperature below the crystallization temperature window for polymer crystallization to produce sodium 3-hydroxybutyrate.

17. The method of production of claim 15, wherein the sequestered amorphous polyhydroxyalkanoate polymer (SAPP) material is further subjected to a temperature crystallization window between about 50° C. and about 90° C., producing a crystallinity of about 20% to about 65%.

18. The method of production of claim 9, wherein the quantity of production of sequestered amorphous polyhydroxyalkanoate polymer (SAPP) material from cellular biomass is sequestered at commercial production levels.

19. A production unit suitable to produce a sequestered amorphous polyhydroxyalkanoate polymer material derived from cellular biomass that is crystal competent comprising
  a microbial fermentation component to produce the cellular biomass;
  a cellular biomass disruption component using mechanical energy to release a mixture of amorphous polyhydroxyalkanoate polymer particles and cellular biomass suspended in an aqueous medium;
  a centrifugation component operating at controlled temperature subjacent to the crystallization window and superjacent to the glass transition temperature to separate the amorphous polyhydroxyalkanoate polymer particles and the cellular biomass based on density differences; and a recovery component for the amorphous polyhydroxyalkanoate polymer particles separated from the cellular biomass as a dispersion of sequestered amorphous polyhydroxyalkanoate polymer (SAPP) material.

20. The method of production of claim 9, further comprising the step of drying the sequestered amorphous polyhydroxyalkanoate polymer material.

* * * * *